United States Patent
Elia et al.

(10) Patent No.: US 8,030,240 B2
(45) Date of Patent: Oct. 4, 2011

(54) MULTIPLE MOLECULAR SIEVE CATALYST FOR SOUR SERVICE DEWAXING

(75) Inventors: Christine N. Elia, Bridgewater, NJ (US); Mohan Kalyanaraman, Media, PA (US); Lei Zhang, Vienna, VA (US); Michel A. Daage, Hellertown, PA (US); Darden Sinclair, Beaumont, TX (US); Valery Sokolovskii, Sunnyvale, CA (US); David M. Lowe, Sunnyvale, CA (US); Jun Han, Sunnyvale, CA (US); Nicholas Ohler, San Leandro, CA (US); Daniel M. Giaquinta, Saratoga, CA (US); Anthony F. Volpe, Jr., Santa Clara, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 195 days.

(21) Appl. No.: 12/316,979

(22) Filed: Dec. 18, 2008

(65) Prior Publication Data

US 2010/0075831 A1    Mar. 25, 2010

Related U.S. Application Data

(60) Provisional application No. 61/009,385, filed on Dec. 28, 2007.

(51) Int. Cl.
*B01J 29/06* (2006.01)

(52) U.S. Cl. .............. 502/66; 502/60; 502/63; 502/64; 502/67; 502/71

(58) Field of Classification Search .............. 502/60, 502/63, 64, 66, 67, 71
See application file for complete search history.

(56) References Cited

U.S. PATENT DOCUMENTS

| | | | | |
|---|---|---|---|---|
| 5,723,716 | A * | 3/1998 | Brandes et al. | 585/734 |
| 6,051,129 | A * | 4/2000 | Harris et al. | 208/138 |
| 6,602,402 | B1 | 8/2003 | Benazzi et al. | |
| 7,148,391 | B1 * | 12/2006 | Buchanan et al. | 585/475 |
| 2006/0091043 | A1 | 5/2006 | Miller | |
| 2007/0209968 | A1 | 9/2007 | Euzen | |

FOREIGN PATENT DOCUMENTS

WO    2004/046278    *    6/2004

OTHER PUBLICATIONS

U.S. Appl. No. 12/316,978, commonly owned copending application, filed Dec. 18, 2008.
U.S. Appl. No. 12/316,977, commonly owned copending application, filed Dec. 18, 2008.

* cited by examiner

*Primary Examiner* — Elizabeth Wood
(74) *Attorney, Agent, or Firm* — Robert A. Migliorini

(57) ABSTRACT

Catalysts for dewaxing of hydrocarbon feeds, particularly feeds with elevated sulfur and nitrogen levels, are provided. The dewaxing catalysts include at least two zeolites, including a zeolite with a low silica to alumina ratio. The catalysts may be combined with a low surface binder, or alternatively the catalysts as formulated may have a high ratio of zeolite surface area to external surface area.

13 Claims, No Drawings

MULTIPLE MOLECULAR SIEVE CATALYST FOR SOUR SERVICE DEWAXING

This application claims the benefit of U.S. Provisional Application No. 61/009,385 filed Dec. 28, 2007.

FIELD OF THE INVENTION

This invention provides a catalyst and a method of using such a catalyst for processing of high sulfur and/or nitrogen content lubricating oil basestocks.

BACKGROUND OF THE INVENTION

Catalytic dewaxing is now a part of many processes for production of desired hydrocarbon products from basestocks having an appropriate boiling range. Catalytic dewaxing allows for conversion of less desirable molecules within a basestock into molecules with more favorable properties for a particular application. Catalytic dewaxing can be used to improve the properties of basestocks in order to form lubricating oils. Catalytic dewaxing also has applications in other areas, such as improvement of cold flow properties of diesel fuels.

Catalytic dewaxing can occur by either cracking of feedstock molecules or by isomerization of feedstock molecules. Catalysts which perform dewaxing primarily by cracking tend to produce products with lower viscosity index and also tend to have lower yields than catalysts which perform dewaxing primarily by isomerization. As a result, isomerization dewaxing catalysts are preferred in many applications.

Conventional isomerization dewaxing catalysts, however, are susceptible to poisoning by sulfur and nitrogen contaminants in a feedstock. As a result, a hydrotreating step or other pre-treatment step often precedes a catalytic dewaxing step, in order to reduce the sulfur and/or nitrogen in a feedstock. Even with a pre-treatment step to remove sulfur, the susceptibility of dewaxing catalysts to sulfur or nitrogen poisoning limits the types of basestocks that can be processed by catalytic dewaxing. Additionally, if a reactor "upset" occurs, so that feedstock is not processed properly in the pre-treatment step, it may be necessary to replace a dewaxing catalyst exposed to high levels of sulfur or nitrogen.

An alternative for feedstocks containing higher levels of nitrogen and sulfur is to solvent dewax the feedstock. While solvent dewaxing is effective for feedstocks with higher levels of impurities, solvent dewaxing is much more costly than catalytic dewaxing. Thus, a catalytic dewaxing solution for dewaxing of high impurity level feedstocks would be preferred.

SUMMARY OF THE INVENTION

In an embodiment, the invention provides a catalyst that includes a first zeolite having unidimensional 10-member ring pores, a second zeolite having a zeolite surface area greater than a zeolite surface area of the first zeolite, and a metal hydrogenation component. The first zeolite is preferably ZSM-48 or ZSM-23. The catalyst may optionally further include a metal oxide binder, preferably a metal oxide binder with a low surface area.

DETAILED DESCRIPTION OF THE EMBODIMENTS

In various embodiments, the invention provides a catalyst suitable for dewaxing of hydrocarbon feedstocks, including sour feedstocks containing high levels of sulfur and/or nitrogen. The catalysts of the invention provide an activity advantage relative to conventional dewaxing catalysts in the presence of high sulfur or high nitrogen feeds. This advantage is achieved by using a combination of two or more molecular sieves as a dewaxing catalyst. Optionally, the dewaxing catalyst can also contain a binder. Preferably, at least one of the molecular sieves is a unidimensional 10-member ring molecular, such as ZSM-48 or ZSM-23. Preferably, the second molecular sieve is a molecular sieve with a greater available surface area than the unidimensional 10-member ring molecular sieve.

Without being bound by any particular theory, it is believed that using a unidimensional 10-member ring molecular sieve provides a high baseline dewaxing activity for a dual molecular sieve catalyst. The addition of a second molecular sieve with a higher surface area provides an advantage for any hydrogenation metals deposited or impregnated on the catalyst. It is believed that the higher surface area molecular sieve provides increased pore volume for hydrogenation metals to reside in. The metals located inside a pore are protected against exposure to bulky molecular species due to steric hindrance. Many of the sources of sulfur and nitrogen atoms within a typical feed are in the form of cyclic, aromatic, or other bulky molecules. As a result, the metals inside the pore are protected from exposure to the S and/or N contaminants that tend to deactivate the hydrogenation functionality. Thus, the combination of a unidimensional 10-member ring molecular sieve with a molecular sieve having higher surface area provides a catalyst with good dewaxing activity that should maintain its activity when exposed to a sour feedstock.

The surface area of a zeolite can be determined by nitrogen porosimetry using the BET method for determining surface area. In particular, for a dual-zeolite catalyst, the surface areas of the individual zeolites can be determined using BET measurements in order to identify a higher surface area zeolites. BET measurements can also be used to determine the surface area of a resulting formulated catalyst, which may also include a binder.

One of the advantages of the catalysts according to the invention is that a wide variety of hydrocarbon feedstreams can be processed without harming the functionality and/or performance of the catalyst. Suitable feedstreams for use with the inventive catalysts can be kerosene, diesel, lubricating oil feedstocks, and other distillate feedstreams including wax-containing feedstreams such as feeds derived from crude oils, shale oils, and tar sands. Synthetic feeds such as those derived from the Fischer-Tropsch can also be treated. Typical wax-containing feedstocks for the preparation of lubricating base oils have initial boiling points of about 315° C. or higher, and include feeds such as reduced crudes, hydrocrackates, raffinates, hydrotreated oils, atmospheric gas oils, vacuum gas oils, coker gas oils, atmospheric and vacuum resids, deasphalted oils, slack waxes and Fischer-Tropsch wax. Such feeds may be derived from distillation towers (atmospheric and vacuum), hydrocrackers, hydrotreaters and solvent extraction units, and may have wax contents of up to 50% or more. Suitable feedstreams can also contain aromatics, such as up to 10 wt % aromatics, or up to 25 wt % aromatics, or up to 50 wt % aromatics.

One of the advantages of the inventive catalyst is the ability to maintain catalytic activity in the presence of elevated levels of nitrogen and sulfur. Conventional catalysts often require pre-treatment of a feedstream to reduce the nitrogen content to a few ppm and the sulfur content to less than a few hundred ppm. By contrast, hydrocarbon feedstreams containing up to 0.2 wt. % of nitrogen, based on the feedstream, and up to 3.0 wt. % of sulfur can be effectively processed using the inventive catalysts. In an embodiment, the sulfur content of a feedstream can be at least 0.05 wt % sulfur, or at least 0.1 wt %, or at least 0.5 wt %, or at least 1 wt %, or at least 2 wt %, or at least 3 wt %. In another embodiment, the nitrogen content of the feedstream can be at least 50 wppm, or at least 100 wppm, or at least 250 wppm, or at least 500 wppm. Sulfur and nitrogen contents may be measured by standard ASTM methods D5453 and D4629, respectively.

Preferably, the catalysts according to the invention are dual-zeolite catalysts that perform dewaxing primarily by isomerizing a hydrocarbon feedstock. More preferably, at least one of the zeolites is a zeolite with a unidimensional pore structure. Suitable first zeolites include 10-member ring zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 and ZSM-23 are more preferred. Note that a catalyst having the ZSM-23 structure with a silica to alumina ratio of from about 20:1 to about 40:1 can sometimes be referred to as SSZ-32. Other molecular sieves that are isostructural with the above materials include Theta-1, NU-10, EU-13, KZ-1, and NU-23. Suitable second zeolites include ZSM-5, ZSM-12, EU-1, ZSM-35, ZSM-11, ZSM-57, NU-87, ZSM-22, ZSM-23, other isostructural molecular sieves, or a combination thereof.

In an embodiment, the silica to alumina ratio in the zeolite is also at a low value. Preferably, the silica to alumina ratio in the zeolite is 100:1 or less, or 85:1 or less, or 75:1 or less, or 70:1 or less. In various embodiments, the amount of silica to alumina corresponding to a "low value" will have some variation. For example, in an embodiment where the zeolite is ZSM-23 (or a structural equivalent), the silica to alumina ratio can be 75:1 or less, or 50:1 or less, or 40:1 or less.

If desired, the dual-zeolite catalyst can also include a binder. The zeolites can be combined with binder in any convenient manner. For example, a bound catalyst can be produced by starting with powders of both the zeolites and catalyst, combining and mulling the powders with added water to form a mixture, and then extruding the mixture to produce a bound catalyst of a desired size. Extrusion aids can also be used to modify the extrusion flow properties of the zeolite and binder mixture.

In embodiments where the catalyst is formulated using a low surface area binder, a low surface area binder represents a binder with a surface area of 100 m$^2$/g or less, or 80 m$^2$/g or less, or 60 m$^2$/g or less.

In yet another embodiment, a binder composed of two or more metal oxides can also be used. In such an embodiment, the weight percentage of the low surface area binder is preferably greater than the weight percentage of the higher surface area binder. For example, in a catalyst that is composed of 65 wt % zeolite and 35 wt % of a binder composed of two or more metal oxides, it is preferable to have at least 20 wt % of the lower surface area binder. Alternatively, if both metal oxides used for forming a mixed metal oxide binder have a sufficiently low surface area, the proportions of each metal oxide in the binder are less important. When two or more metal oxides are used to form a binder, the two metal oxides can be incorporated into the catalyst by any convenient method. For example, one binder can be mixed with the zeolite during formation of the zeolite powder, such as during spray drying. The spray dried zeolite/binder powder can then be mixed with the second metal oxide binder prior to extrusion.

Without being bound by any particular theory, it is believed that use of a low surface area binder and/or a formulated catalyst with a high ratio of zeolite surface area to external surface area provides several benefits. It is believed that at least one of the benefits is that catalysts according to the invention allow a greater percentage of metal components to reside on the zeolite portion of the catalyst, as opposed to on the binder. This leads to increased metals levels within the pores of the zeolite, where the metals are protected from some of the sulfur or nitrogen contaminants in a feedstream. Metals that reside on the zeolite portion of the catalyst can either be located on an exposed surface of the zeolite, or the metals can be located within a pore in the zeolite. Due to steric effects, metals within the pores of a zeolite will not be exposed to bulky molecules within a feedstream, such as molecules containing aromatic rings. The inclusion of a second zeolite with a higher zeolite surface area than the zeolite with 10-member ring pores is believed to enhance this effect. Many of the common molecules within a feedstock that carry sulfur or nitrogen atoms are molecules that also include rings and/or other bulky functional groups. Such molecules cannot readily enter the 10-member ring pores of a zeolite, which therefore protects the metals within the pore from interacting with the sulfur and/or nitrogen contaminants.

In various embodiments, the catalysts according to the invention further include a metal hydrogenation component. The metal hydrogenation component is typically a Group VI and/or a Group VIII metal. Preferably, the metal hydrogenation component is a Group VIII noble metal. More preferably, the metal hydrogenation component is Pt, Pd, or a mixture thereof.

The metal hydrogenation component may be added to the catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) after extrusion.

One example of a dewaxing catalyst suitable for use in the claimed invention is ZSM-48 with a SiO$_2$:Al$_2$O$_3$ ratio of less than 110, preferably from about 70 to about 110. Another example of a dewaxing catalyst suitable for use in the claimed invention is ZSM-48 with a SiO$_2$:Al$_2$O$_3$ ratio of less than 200, preferably from about 70 to about 190. In the embodiments below, ZSM-48 crystals will be described variously in terms of "as-synthesized" crystals that still contain the organic template; calcined crystals, such as Na-form ZSM-48 crystals; or calcined and ion-exchanged crystals, such as H-form ZSM-48 crystals.

The ZSM-48 crystals after removal of the structural directing agent have a particular morphology and a molar composition according to the general formula:

$$(n)\text{SiO}_2:\text{Al}_2\text{O}_3$$

where n is from 70 to 110, preferably 80 to 100, more preferably 85 to 95. In another embodiment, n is at least 70, or at least 80, or at least 85. In yet another embodiment, n is 110 or less, or 100 or less, or 95 or less. In still other embodiments, Si may be replaced by Ge and Al may be replaced by Ga, B, Fe, Ti, V, and Zr. Alternatively, n can be from 70 to 200, preferably 80 to 190. In alternative embodiments, n is 200 or less, or 190 or less, or 180 or less.

The as-synthesized form of ZSM-48 crystals is prepared from a mixture having silica, alumina, base and hexamethonium salt directing agent. In an embodiment, the molar ratio of structural directing agent:silica in the mixture is less than 0.05, or less than 0.025, or less than 0.022. In another embodiment, the molar ratio of structural directing agent:silica in the mixture is at least 0.01, or at least 0.015, or at least 0.016. In still another embodiment, the molar ratio of structural directing agent:silica in the mixture is from 0.015 to 0.025, preferably 0.016 to 0.022. In an embodiment, the as-synthesized form of ZSM-48 crystals has a silica:alumina molar ratio of 70 to 110. In still another embodiment, the as-synthesized form of ZSM-48 crystals has a silica:alumina molar ratio of at least 70, or at least 80, or at least 85. In yet another embodiment, the as-synthesized form of ZSM-48 crystals has a silica:alumina molar ratio of 110 or less, or 100 or less, or 95 or less. In alternative to embodiments, the as-synthesized form of ZSM-48 crystals has a silica:alumina molar ratio of 200 or less, or 190 or less, or 180 or less. For any given preparation of the as-synthesized form of ZSM-48 crystals, the molar composition will contain silica, alumina and directing agent. It should be noted that the as-synthesized form of ZSM-48 crystals may have molar ratios slightly different from the molar ratios of reactants of the reaction mixture used to prepare the as-synthesized form. This result may occur due to incomplete incorporation of 100% of the reactants of the reaction mixture into the crystals formed (from the reaction mixture).

The ZSM-48 zeolite in either a calcined or as-synthesized form typically forms agglomerates of small crystals that may have crystal sizes in the range of about 0.01 to about 1 μm. These small crystals are desirable for they generally lead to greater activity. Smaller crystals mean greater surface area which leads to a greater number of active catalytic sites per given amount of catalyst. Preferably, the ZSM-48 crystals in either a calcined or as-synthesized form have a morphology containing no fibrous crystals. By fibrous is meant crystals that have a L/D ratio of >10/1, where L and D represent the length and diameter of the crystal. In another embodiment, the ZSM-48 crystals in either a calcined or as-synthesized form have a low quantity or are free of needle-like crystals. By needle-like is meant crystals that have a L/D ratio of <10/1, preferably less than 5/1, more preferably between 3/1 and 5/1. The SEM shows that crystals prepared according to the methods herein have no detectable crystals having a fibrous or needle-like morphology. This morphology alone or coupled with the low silica:alumina ratios leads to catalysts having high activity as well as desirable environmental features.

The ZSM-48 composition is prepared from an aqueous reaction mixture comprising silica or silicate salt, alumina or soluble aluminate salt, base and directing agent. In an example of a reaction mixture to achieve the desired crystal morphology, the reactants in reaction mixture have the following molar ratios:

$SiO_2:Al_2O_3$=70 to 110
$H_2O:SiO_2$=1 to 500
$OH^-:SiO_2$=0.1 to 0.3
$OH^-:SiO_2$ (preferred)=0.14 to 0.18
template:$SiO_2$=0.01–0.05
template:$SiO_2$ (preferred)=0.015 to 0.025

In the above ratios, two ranges are provided for both the base:silica ratio and the structure directing agent:silica ratio. The broader ranges for these ratios include mixtures that result in the formation of ZSM-48 crystals with some quantity of Kenyaite and/or needle-like morphology. For situations where Kenyaite and/or needle-like morphology is not desired, the preferred ranges should be used, as is further illustrated below in the Examples. In alternative embodiments, the molar ratio of silica to alumina in the reaction mixture may be increased to up to about 200.

The silica source is preferably precipitated silica and is commercially available from Degussa. Other silica sources include powdered silica including precipitated silica such as Zeosil® and silica gels, silicic acid colloidal silica such as Ludox® or dissolved silica. In the presence of a base, these other silica sources may form silicates. The alumina may be in the form of a soluble salt, preferably the sodium salt and is commercially available from US Aluminate. Other suitable aluminum sources include other aluminum salts such as the chloride, aluminum alcoholates or hydrated alumina such as gamma alumina, pseudobohemite and colloidal alumina. The base used to dissolve the metal oxide can be any alkali metal hydroxide, preferably sodium or potassium hydroxide, ammonium hydroxide, diquaternary hydroxide and the like. The directing agent is a hexamethonium salt such as hexamethonium dichloride or hexamethonium hydroxide. The anion (other than chloride) could be other anions such as hydroxide, nitrate, sulfate, other halide and the like. Hexamethonium dichloride is N,N,N,N',N',N'-hexamethyl-1,6-hexanediammonium dichloride.

In an embodiment, the crystals obtained from the synthesis according to the invention have a morphology that is free of fibrous morphology. Fibrous morphology is not desired, as this crystal morphology inhibits the catalytic dewaxing activity of ZSM-48. In another embodiment, the crystals obtained from the synthesis according to the invention have a morphology that contains a low percentage of needle-like morphology. The amount of needle-like morphology present in the ZSM-48 crystals can be 10% or less, or 5% or less, or 1% or less. In an alternative embodiment, the ZSM-48 crystals can be free of needle-like morphology. Low amounts of needle-like crystals are preferred for some applications as needle-like crystals are believed to reduce the activity of ZSM-48 for some types of reactions. To obtain a desired morphology in high purity, the ratios of silica:alumina, base:silica and directing agent:silica in the reaction mixture according to embodiments of the invention should be employed. Additionally, if a composition free of Kenyaite and/or free of needle-like morphology is desired, the preferred ranges should be used.

The as-synthesized ZSM-48 crystals should be at least partially dried prior to use or further treatment. Drying may be accomplished by heating at temperatures of from 100 to 400° C., preferably from 100 to 250° C. Pressures may be atmospheric or subatmospheric. If drying is performed under partial vacuum conditions, the temperatures may be lower than those at atmospheric pressures Catalysts are typically bound with a binder or matrix material prior to use. Binders are resistant to temperatures of the use desired and are attrition resistant. Binders may be catalytically active or inactive and include other zeolites, other inorganic materials such as clays and metal oxides such as alumina, silica, titania, zirconia, and silica-alumina. Clays may be kaolin, bentonite and montmorillonite and are commercially available. They may be blended with other materials such as silicates. Other porous matrix materials in addition to silica-aluminas include other binary materials such as silica-magnesia, silica-thoria, silica-zirconia, silica-beryllia and silica-titania as well as ternary materials such as silica-alumina-magnesia, silica-alumina-thoria and silica-alumina-zirconia. The matrix can be in the form of a co-gel. The bound ZSM-48 may range from 10 to 100 wt. % ZSM-48, based on bound ZSM-48 with the balance being binder.

ZSM-48 crystals as part of a catalyst may also be used with a metal hydrogenation component. Metal hydrogenation components may be from Groups 6-12 of the Periodic Table based on the IUPAC system having Groups 1-18, preferably Groups 6 and 8-10. Examples of such metals include Ni, Mo, Co, W, Mn, Cu, Zn, Ru, Pt or Pd, preferably Pt or Pd. Mixtures of hydrogenation metals may also be used such as Co/Mo, Ni/Mo, Ni/W and Pt/Pd, preferably Pt/Pd. The amount of hydrogenation metal or metals may range from 0.1 to 5 wt. %, based on catalyst. In an embodiment, the amount of metal or metals is at least 0.1 wt %, or at least 0.25 wt %, or at least 0.5 wt %, or at least 0.6 wt %, or at least 0.75 wt %. In another embodiment, the amount of metal or metals is 5 wt % or less, or 4 wt % or less, or 3 wt % or less, or 2 wt % or less, or 1 wt % or less. Methods of loading metal onto ZSM-48 catalyst are well known and include, for example, impregnation of ZSM-48 catalyst with a metal salt of the hydrogenation component and heating. The ZSM-48 catalyst containing hydrogenation metal may also be sulfided prior to use. The catalyst may also be steamed prior to use.

High purity ZSM-48 crystals made according to the above embodiments have a relatively low silica:alumina ratio. This lower silica:alumina ratio mean that the present catalysts are more acidic. In spite of this increased acidity, they have superior activity and selectivity as well as excellent yields. They also have environmental benefits from the standpoint of health effects from crystal form and the small crystal size is also beneficial to catalyst activity.

For catalysts according to the invention that incorporate ZSM-23, any suitable method for producing ZSM-23 with a low $SiO_2:Al_2O_3$ ratio may be used. U.S. Pat. No. 5,332,566 provides an example of a synthesis method suitable for producing ZSM-23 with a low ratio of $SiO_2:Al_2O_3$. For example, a directing agent suitable for preparing ZSM-23 can be formed by methylating iminobispropylamine with an excess of iodomethane. The methylation is achieved by adding the iodomethane dropwise to iminobispropylamine which is solvated in absolute ethanol. The mixture is heated to a reflux temperature of 77° C. for 18 hours. The resulting solid product is filtered and washed with absolute ethanol.

The directing agent produced by the above method can then be mixed with colloidal silica sol (30% $SiO_2$), a source of alumina, a source of alkali cations (such as Na or K), and deionized water to form a hydrogel. The alumina source can be any convenient source, such as alumina sulfate or sodium aluminate. The solution is then heated to a crystallization temperature, such as 170° C., and the resulting ZSM-23 crystals are dried.

The following examples demonstrate the benefits of dual-zeolite catalysts.

EXAMPLE 1

0.5 wt % Pt(IE) on 65/35 ZSM-48(180/1 Si/Al2)/Sn—ZSM-5

An extrudate consisting of 65 wt % ZSM-48 and 35 wt % Sn—ZSM-5 (30 grams) was humidified with moist air, placed in a mesh basket, and submerged in 150 cc deionized water with magnetic stirbar. The silica to alumina ratio of the ZSM-48 was about 180:1. The pH of the solution was then adjusted to a pH of 8 with ammonium hydroxide. A solution of platinum tetraammine nitrate (5.07 g) in 25 cc deionized water was added to the stirring solution. The solution was stirred for 16 hours. The catalyst was then washed with 500 cc deionized water, dried at 250° F., and calcined in full air at 680° F. for 8 hours.

The activity of the catalyst was tested by determining the cloud point of a product resulting from exposing the catalyst to a 130N raffinate feed in a batch micro-autoclave system. 300.2 mg of catalyst was reduced under hydrogen followed by the addition of 2.5 grams of the 130N feedstock. The reaction was run at 400 prig and 330° C. for 12 hours. Results are provided in Table 1.

EXAMPLE 2

0.4 wt % Pt(IE) on 50/50 ZSM-48(70/1 Si/Al2)/Sn—ZSM-5

An extrudate consisting of 50 wt % ZSM-48 and 50 wt % Sn—ZSM-5 (30 grams) was humidified with moist air, placed in a mesh basket, and submerged in 150 cc deionized water with magnetic stirbar. The silica to alumina ratio of the ZSM-48 was about 70:1. The pH of the solution was then adjusted to a pH of 8 with ammonium hydroxide. A solution of platinum tetraammine nitrate (5.07 g) in 25 cc deionized water was added to the stirring solution. The solution was stirred for 16 hours. The catalyst was then washed with 500 cc deionized water, dried at 250° F., and calcined in full air at 680° F. for 8 hours.

The activity of the catalyst was tested by determining the cloud point of a product resulting from exposing the catalyst to a 130N raffinate feed in a batch micro-autoclave system. 302.1 mg of catalyst was reduced under hydrogen followed by the addition of 2.5 grams of the 130N feedstock. The reaction was run at 400 psig and 330° C. for 12 hours. Results are provided in Table 1.

EXAMPLE 3

0.3 wt % Pt(IE) on 65/35 ZSM-48(180/1 Si/Al2)/Mordenite

An extrudate consisting of 65 wt % ZSM-48 and 35 wt % Mordenite (30 grams) was humidified with moist air, placed in a mesh basket, and submerged in 150 cc deionized water with magnetic stirbar. The silica to alumina ratio of the ZSM-48 was about 180:1. The pH of the solution was then adjusted to a pH of 8 with ammonium hydroxide. A solution of platinum tetraammine nitrate (5.07 g) in 25 cc deionized water was added to the stirring solution. The solution was stirred for 16 hours. The catalyst was then washed with 500 cc deionized water, dried at 250° F., and calcined in full air at 680° F. for 8 hours.

The activity of the catalyst was tested by determining the cloud point of a product resulting from exposing the catalyst to a 130N raffinate feed in a batch micro-autoclave system. 256.4 mg of catalyst was reduced under hydrogen followed by the addition of 2.5 grams of the 130N feedstock. The reaction was run at 400 psig and 330° C. for 12 hours. Results are provided in Table 1.

EXAMPLE 4

0.3 wt % Pt(IE) on 65/35 ZSM-48(180/1 Si/Al2)/ZSM-12

An extrudate consisting of 65 wt % ZSM-48 and 35 wt % ZSM-12 (30 grams) was humidified with moist air, placed in a mesh basket, and submerged in 150 cc deionized water with magnetic stirbar. The silica to alumina ratio of the ZSM-48 was about 180:1. The pH of the solution was then adjusted to a pH of 8 with ammonium hydroxide. A solution of platinum tetraammine nitrate (5.07 g) in 25 cc deionized water was added to the stirring solution. The solution was stirred for 16 hours. The catalyst was then washed with 500 cc deionized water, dried at 250° F., and calcined in full air at 680° F. for 8 hours.

The activity of the catalyst was tested by determining the cloud point of a product resulting from exposing the catalyst to a 130N raffinate feed in a batch micro-autoclave system. 254.8 mg of catalyst was reduced under hydrogen followed by the addition of 2.5 grams of the 130N feedstock. The reaction was run at 400 psig and 330° C. for 12 hours. Results are provided in Table 1.

EXAMPLE 5

2× Silica Selectivated 0.8 wt % Pt(IW) on 65/35 ZSM-48(180/1 Si/Al2)/Mordenite

An extrudate consisting of 65% ZSM-48 and 35% Mordenite (75 grams) was loaded with 0.8 wt % Pt by incipient wetness impregnation with platinum tetraammine nitrate, drying at 250° F. and calcining in full air at 680° F. for 3 hours. The silica to alumina ratio of the ZSM-48 was about 180:1. The Pt containing extrudate was then selectivated with silica by impregnation with to 7.8 wt % DOW™-500 silicone in decane, stripping the decane, and calcining at 1000° F. This procedure was repeated one more time.

The activity of the catalyst was tested by determining the cloud point of a product resulting from exposing the catalyst to a 130N raffinate feed in a batch micro-autoclave system. Less than 1 gram of catalyst was reduced under hydrogen followed by the addition of 2.5 grams of the 130N feedstock. The reaction was run at 400 psig and 330° C. for 12 hours. Results are provided in Table 1.

EXAMPLE 6

2× Silica Selectivated 0.8 wt % Pt(IW) on 65/35 ZSM-48(180/1 Si/Al2)/ZSM-12

An extrudate consisting of 65% ZSM-48 and 35% ZSM-12 (75 grams) was loaded with 0.8 wt % Pt by incipient wetness impregnation with platinum tetraammine nitrate, drying at 250° F. and calcining in full air at 680° F. for 3 hours. The silica to alumina ratio of the ZSM-48 was about 180:1. The Pt containing extrudate was then selectivated with silica by impregnation with 7.8 wt % DOW™-500 silicone in decane, stripping the decane, and calcining at 1000° F. This procedure was repeated one more time.

The activity of the catalyst was tested by determining the cloud point of a product resulting from exposing the catalyst to a 130N raffinate feed in a batch micro-autoclave system. Less than 1 gram of catalyst was reduced under hydrogen followed by the addition of 2.5 grams of the 130N feedstock. The reaction was run at 400 psig and 330° C. for 12 hours. Results are provided in Table 1.

EXAMPLE 7

(Comparative) 0.6 wt % Pt(IW) on steamed 65/35 ZSM-48(180/1 Si/Al2)

An extrudate consisting of 65 wt % ZSM-48 and 35 wt % alumina (30 grams) was humidified with moist air, placed in a mesh basket, and submerged in 150 cc deionized water with magnetic stirbar. The silica to alumina ratio of the ZSM-48 was about 180:1. The pH of the solution was then adjusted to a pH of 8 with ammonium hydroxide. A solution of platinum tetraammine nitrate (5.07 g) in 25 cc deionized water was added to the stirring solution. The solution was stirred for 16 hours. The catalyst was then washed with 500 cc deionized water, dried at 250° F., and calcined in full air at 680° F. for 8 hours. The resulting catalyst was then steamed for 3 hours.

The activity of the catalyst was tested by determining the cloud point of a product resulting from exposing the catalyst to a 130N raffinate feed in two separate trials in a batch micro-autoclave system. In one trial, 321.6 mg of catalyst was reduced under hydrogen followed by the addition of 2.5 grams of the 130N feedstock. The reaction was run at 400 psig and 330° C. for 12 hours. In the second trial, 303.3 mg of catalyst was reduced under hydrogen followed by the addition of 2.5 grams of the 130N feedstock. The reaction was run at 400 psig and 330° C. for 12 hours. Results are provided in Table 1.

TABLE 1

| Example | WHSV | Cloud Point | Corrected Mass Loss |
| --- | --- | --- | --- |
| 1 | 0.7 | −45 | 30% |
| 2 | 0.7 | −29 | 27% |
| 3 | 0.82 | 11 | 16% |
| 4 | 0.82 | −38 | 31.6 |
| 5 | 0.70 | 20 | 11.0% |
| 6 | 0.69 | 26 | 6.4% |
| 7a | 0.66 | −13 | 17.8% |
| 7b | 0.7 | −20 | 19.1% |

Without being bound by any particular theory, it is believed that the role of the second zeolite can be two-fold. First, we chose zeolites where the platinum can be readily located within the zeolite rather than externally on an alumina binder. Platinum was ion exchanged to preferentially target exchange sites within the zeolites. The platinum located within the zeolite should be less accessible to the bulky sulfur and nitrogen species, protecting its function to focus on isomerization. The benefits of having a zeolite with a higher zeolite surface area can be seen by comparing Examples 7a and 7b with Examples 1, 2, and 4. In Examples 1, 2, and 4, zeolites with a higher zeolite surface area (ZSM-5 and ZSM-12) provide increase internal pore area for the Pt hydrogenation functionality. Examples 1, 2, and 4 provide the lowest cloud points in the series of dewaxing runs.

Alternatively, the second zeolite may also add additional acid function to the catalyst and aid in the dewaxing of the feed. The addition of Sn—ZSM-5 (examples 1 and 2) as well as the addition of ZSM-12, example 4) show dramatically higher activity than the base case formulations. The mordenite did not show the same benefit in terms of activity, even though the mordenite crystal itself has a much higher acid function based on hexane cracking than the ZSM-48 and a higher n-hexane cracking activity (alpha). Interestingly, Sn—ZSM-5 and ZSM-12 bracket the acidity of the ZSM-48 catalyst. Sn—ZSM-5 has Sn in the framework of the ZSM-5 rather than alumina. The n-hexane cracking activity (alpha) of Sn—ZSM-5 is much lower than the ZSM-48 itself. Table 2 below provides info on $Si/Al_2$ ratios and alpha activity of the pure crystals.

The silica selectivated catalysts of Examples 5 and 6 represent an attempt to further protect the metal hydrogenation function present on the catalysts. The silica selectivation was introduced after the introduction of the metal hydrogenation component on to the catalyst, which should have reduced the pore sizes of the pores in the catalysts. This could have possibly resulted in further protection of the metal hydrogenation component by further restricting the access of bulky molecules into catalyst pores. However, the silica selectivation appeared to generally decrease the activity in the catalyst, as was found both for the ZSM-48/mordenite combination and the ZSM-48/ZSM-12 combination.

TABLE 2

| H-Zeolite | Si/Al2 | Alpha (G103) |
|---|---|---|
| ZSM-48 | 180 | 24 |
| ZSM-12 | 220 | 53 |
| Sn-ZSM-5 | N/A (Sn instead of Al) | 8 |
| Mordenite | 35 | 610 |

What is claimed is:

1. A catalyst comprising:
   a first zeolite having unidimensional 10-member ring pores, wherein the first zeolite is EU-2, EU-11, ZBM-30, ZSM-48, ZSM-23, or a combination thereof;
   a second zeolite having a zeolite surface area greater than a zeolite surface area of the first zeolite, wherein the second zeolite is Sn—ZSM-5; and
   a metal hydrogenation component,
   wherein the catalyst further comprises a metal oxide binder in powder form having a surface area of 80 m$^2$/g or less.

2. The catalyst of claim 1, wherein the first zeolite is ZSM-48, ZSM-23, or a combination thereof.

3. The catalyst of claim 1, wherein the first zeolite is ZSM-48.

4. The catalyst of claim 1, wherein the ratio of $SiO_2:Al_2O_3$ in the first zeolite is 200:1 or less.

5. The catalyst of claim 1, wherein the ratio of $SiO_2:Al_2O_3$ in the first zeolite is 100:1 or less.

6. The catalyst of claim 1, wherein the metal hydrogenation component is a Group VIII noble metal.

7. The catalyst of claim 1, wherein the metal hydrogenation component is Pt, Pd, or a combination thereof.

8. The catalyst of claim 1, wherein the catalyst has a ratio of zeolite surface area to external surface area of at least 90:100.

9. The catalyst of claim 1, wherein the catalyst has a ratio of zeolite surface area to external surface area of at least 1:1.

10. The catalyst of claim 1, wherein the binder is silica, alumina, titania, zirconia, or silica-alumina.

11. The catalyst of claim 1, wherein the binder further comprises a second metal oxide different from the first metal oxide.

12. The catalyst of claim 11, wherein a weight percentage of the second metal oxide in the catalyst is lower than a weight percentage of the first metal oxide, the first metal oxide in powder form having a surface area of 80 m$^2$/g or less.

13. The catalyst of claim 12, wherein the second metal oxide is an silica, alumina, titania, zirconia, or silica-alumina.

* * * * *